United States Patent
Ebeid

(10) Patent No.: US 8,331,557 B2
(45) Date of Patent: *Dec. 11, 2012

(54) POWER ANALYSIS ATTACK COUNTERMEASURE FOR THE ECDSA

(75) Inventor: Nevine Maurice Nassif Ebeid, Kitchener (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/222,104

(22) Filed: Aug. 31, 2011

(65) Prior Publication Data

US 2011/0314292 A1 Dec. 22, 2011

Related U.S. Application Data

(63) Continuation of application No. 12/040,196, filed on Feb. 29, 2008, now Pat. No. 8,027,466.

(60) Provisional application No. 60/893,522, filed on Mar. 7, 2007.

(51) Int. Cl.
*H04L 9/28* (2006.01)

(52) U.S. Cl. ........................................... 380/28

(58) Field of Classification Search ............... 380/1, 28, 380/30

See application file for complete search history.

(56) References Cited

U.S. PATENT DOCUMENTS

| 7,062,043 | B1 | 6/2006 | Solinas | |
|---|---|---|---|---|
| 8,027,466 | B2 * | 9/2011 | Ebeid | 380/28 |
| 2003/0194086 | A1 * | 10/2003 | Lambert | 380/44 |

FOREIGN PATENT DOCUMENTS

| CA | 2259089 A1 | 7/2000 |
|---|---|---|
| CA | 2424484 A1 | 11/2003 |

OTHER PUBLICATIONS

US Department of Commerce, Announcing the Standard for Digital Signature Standard (DSS), May 19, 1994, Federal Information Processing Standards Publication 186, Gaithersburg, MD_www.itl.nist.gov_fipspubs_fip186.pdf.

US Department of Commerce, Announcing the Digital Signature Standard (DSS), Jan. 27, 2000, Federal Information Processing Standards Publication 186-2, Gaithersburg, MD.

US Department of Commerce, Announcing the Digital Signature Standard (DSS), Dec. 15, 1998, Federal Information Processing Standards Publication 186-1, Gaithersburg, MD.

(Continued)

*Primary Examiner* — Edward Zee
(74) *Attorney, Agent, or Firm* — Ridout & Maybee LLP

(57) ABSTRACT

Execution of the Elliptic Curve Digital Signature Algorithm (ECDSA) requires determination of a signature, which determination involves arithmetic operations. Some of the arithmetic operations employ a long term cryptographic key. It is the execution of these arithmetic operations that can make the execution of the ECDSA vulnerable to a power analysis attack. In particular, an attacker using a power analysis attack may determine the long term cryptographic key. By modifying the sequence of operations involved in the determination of the signature and the inputs to those operations, power analysis attacks may no longer be applied to determine the long term cryptographic key.

5 Claims, 4 Drawing Sheets

OTHER PUBLICATIONS

Thomas S Messerges, Ezzy A Dabbish and Robert H Slaon, Investigations of Power Analysis Attacks on Smartcards, USENIX Workshop on Smartcard Technology, May 10-11, 1999, Chicago, Illinois, USA.

M Joye, P. Pallier and B Schoenmakers, On second-order differential power analysis, Cryptographic Hardware and Embedded Systems—CHES '05, LNCS, vol. 3659, pp. 293-308 Springer-Verlag, 2005.

Extended European Search Report, regarding application No. EP 08733549.3 dated Sep. 10, 2010.

Trichina E et al., Implementation of Elliptic Curve Cryptography with Built-in Counter Measures Against Side Channel Attacks, Cryptographic Hardware and Embedded Systems, Internationalworkshop, Aug. 13, 2002.

* cited by examiner

POWER ANALYSIS ATTACK COUNTERMEASURE FOR THE ECDSA

CROSS REFERENCE TO RELATED APPLICATIONS

The present application is a continuation of U.S. patent application Ser. No. 12/040,196, filed Feb. 29, 2008. U.S. patent application Ser. No. 12/040,196 claims priority to U.S. Provisional Patent Application Ser. No. 60/893,522, filed Mar. 7, 2007, the contents of both applications are hereby incorporated herein by reference.

The present application is related to US Patent Application Publication No. 2008/0219438, the contents of which are hereby incorporated herein by reference.

The present application is related to US Patent Application Publication No. 2008/0219437, the contents of which are hereby incorporated herein by reference.

The present application is related to US Patent Application Publication No. 2008/0219450, the contents of which are hereby incorporated herein by reference.

The present application is related to US Patent Application Publication No. 2008/0275932, the contents of which are hereby incorporated herein by reference.

The present application is related to US Patent Application Publication No. 2008/0301459, the contents of which are hereby incorporated herein by reference.

The present application is related to US Patent Application Publication No. 2008/0273694, the contents of which are hereby incorporated herein by reference.

FIELD OF THE INVENTION

The present application relates generally to cryptography and, more specifically, to measures for countering power analysis attacks on a physical implementation of the Elliptic Curve Digital Signature Algorithm (ECDSA).

BACKGROUND OF THE INVENTION

Cryptography is the study of mathematical techniques that provide the base of secure communication in the presence of malicious adversaries. The main goals of secure communication include confidentiality of data, integrity of data and authentication of entities involved in a transaction. Historically, "symmetric key" cryptography was used to attempt to meet the goals of secure communication. However, symmetric key cryptography involves entities exchanging secret keys through a secret channel prior to communication. One weakness of symmetric key cryptography is the security of the secret channel. Public key cryptography provides a means of securing a communication between two entities without requiring the two entities to exchange secret keys through a secret channel prior to the communication. An example entity "A" selects a pair of keys: a private key that is only known to entity A and is kept secret; and a public key that is known to the public. If an example entity "B" would like to send a secure message to entity A, then entity B needs to obtain an authentic copy of entity A's public key. Entity B encrypts a message intended for entity A by using entity A's public key. Accordingly, only entity A can decrypt the message from entity B.

For secure communication, entity A selects the pair of keys such that it is computationally infeasible to compute the private key given knowledge of the public key. This condition is achieved by the difficulty (technically known as "hardness") of known mathematical problems such as the known integer factorization mathematical problem, on which is based the known RSA algorithm, which was publicly described in 1977 by Ron Rivest, Adi Shamir and Leonard Adleman.

Elliptic curve cryptography is an approach to public key cryptography based on the algebraic structure of elliptic curves over finite mathematical fields. An elliptic curve over a finite field, K, may be defined by a Weierstrass equation of the form $$y^2 a_1 xy + a_3 y = x^3 + a_2 x^2 + a_4 x + a_6. \quad (1.1)$$

If $K = F_p$, where p is greater than three and is a prime, equation (1.1) can be simplified to $$y^2 = x^3 + ax + b. \quad (1.2)$$

If $K = F_{2^m}$, i.e., the elliptic curve is defined over a binary field, equation (1.1) can be simplified to $$y^2 + xy = x^3 + ax^2 + b. \quad (1.3)$$

The set of points on such a curve (i.e., all solutions of the equation together with a point at infinity) can be shown to form an abelian group (with the point at infinity as the identity element). If the coordinates x and y are chosen from a large finite field, the solutions form a finite abelian group.

Elliptic curve cryptosystems rely on the hardness of a problem called the Elliptic Curve Discrete Logarithm Problem (ECDLP). Where P is a point on an elliptic curve E and where the coordinates of P belong to a finite field, the scalar multiplication kP, where k is a secret integer, gives a point Q equivalent to adding the point P to itself k times. It is computationally infeasible, for large finite fields, to compute k knowing P and Q. The ECDLP is: find k given P and Q (=kP).

BRIEF DESCRIPTION OF THE DRAWINGS

Reference will now be made to the drawings, which show by way of example, embodiments of the invention, and in which.

DETAILED DESCRIPTION OF THE EMBODIMENTS

Figure 1:
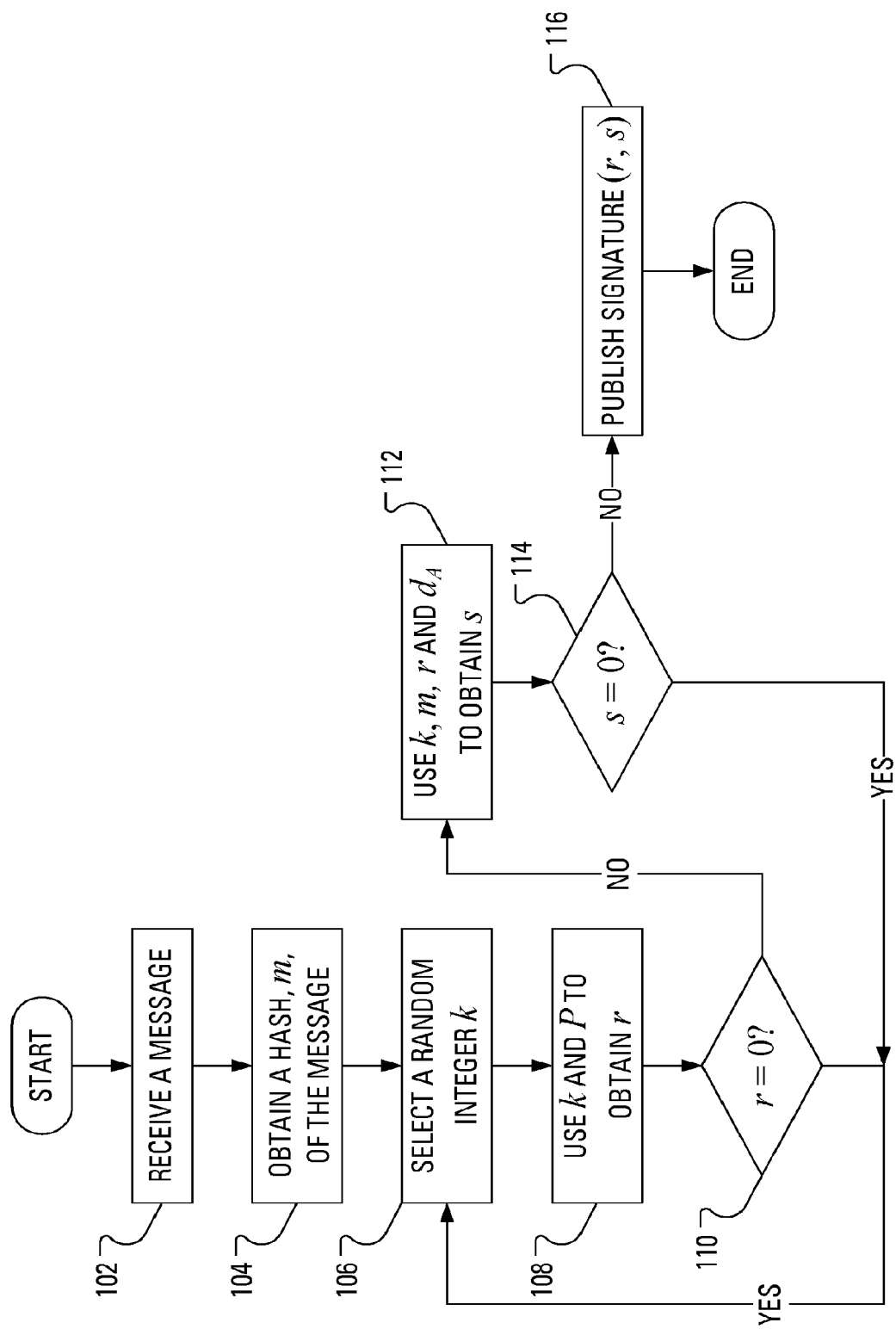
FIG. 1 illustrates steps of a typical method of carrying out the ECDSA.

By providing variation in the order of arithmetic operations in the ECDSA in which a long term key is involved, a vulnerability to power analysis attacks that has been found in the determination of the signature is obviated. That is, by modifying the sequence of operations involved in the determination of the signature and the inputs to those operations, power analysis attacks lose applicability.

In accordance with an aspect of the present application there is provided a method of publishing a signature related to a message in a manner that counters power analysis attacks, where a private cryptographic key and a base point on a given elliptic curve have been selected. The method includes receiving a message, obtaining a hash of the message, selecting a first random integer, obtaining a non-zero first element of the signature based on the base point and the first random integer, selecting a second random integer and obtaining a non-zero second element of the signature based on the first random integer, the hash, the first element, the private cryptographic key and the second random integer, where obtaining the second element involves: determining a first modular multiplication product of the private cryptographic key and the second random integer; and determining a second modular multiplication product of the first element and a modular inverse of the second random integer. The method further includes publishing the first element of the signature and the second element of the signature. In other aspects of the present application, a mobile communication device is provided for carrying out this method and a computer readable medium is provided for adapting a processor to carry out this method.

In accordance with another aspect of the present application there is provided a method of publishing a signature related to a message in a manner that counters power analysis attacks, where a private cryptographic key and a base point on a given elliptic curve have been selected. The method includes receiving a message, obtaining a hash of the message, selecting a random integer, obtaining a non-zero first element of the signature based on the base point and the random integer and obtaining a non-zero second element of the signature based on the random integer, the hash, the first element and the private cryptographic key, where obtaining the second element involves: determining a first modular multiplication product of the private cryptographic key and a modular inverse of the random integer and determining a second modular multiplication product of the first product and the first element. The method also includes publishing the first element of the signature and the second element of the signature. In other aspects of the present application, a mobile communication device is provided for carrying out this method and a computer readable medium is provided for adapting a processor to carry out this method.

In accordance with a further aspect of the present application there is provided a method of countering power analysis attacks on an operation to determine a signature related to a message, where a private cryptographic key and a base point on a given elliptic curve have been selected, the base point having a prime order. The method includes receiving a message, obtaining a hash of the message, selecting a first random integer, obtaining a non-zero first element of the signature based on the base point and the first random integer, selecting a second random integer and obtaining a non-zero second element of the signature based on the first random integer, the hash, the first element, the private cryptographic key the second random integer. The obtaining of the second element involves: determining a first modular multiplication product of the private cryptographic key and the second random integer; and determining a second modular multiplication product of the first element and a modular inverse of the second random integer.

Other aspects and features of the present invention will become apparent to those of ordinary skill in the art upon review of the following description of specific embodiments of the invention in conjunction with the accompanying figures.

In general, a device implementing an Elliptic Curve Cryptosystem selects a value for a secret key, k, which may be a long term secret key or a short term secret key. Additionally, the device has access to a "base point", P. The device then generates Q=kP and publishes Q as a public key. Q may then be used for encryption or may then be used in a key agreement protocol such as the known Elliptic Curve Diffie-Hellman (ECDH) key agreement protocol. In the known Elliptic Curve Menezes-Qu-Vanstone (ECMQV) key agreement protocol, and the known Elliptic Curve Digital Signature Algorithm (ECDSA), each entity has a pair of keys (public key, private key), say, for entity A, this pair is ($Q_A$, $d_A$). This is long term pair, hence $Q_A=d_A P$ is computed once per key life. Notably, in another step of the ECMQV key agreement protocol and the ECDSA, there is a random integer k that is multiplied by the base point P, i.e., kP is determined.

The general point of an attack on a cryptosystem is to determine the value of the private key. Recently, especially given the mathematical difficulty of solving the ECDLP, cryptosystem attacks have been developed that are based on careful measurements of the physical implementation of a cryptosystem, rather than theoretical weaknesses in the algorithms. This type of attack is called a "side channel attack". In one known example side channel attack, a measurement of the exact amount of time taken by known hardware to encrypt plain text has been used to simplify the search for a likely private key. Other examples of side channel attacks involve measuring such physical quantities as power consumption, electromagnetic leaks and sound. Many side channel attacks require considerable technical knowledge of the internal operation of the system on which the cryptography is implemented. In particular, a power monitoring attack involves obtaining information useful to the determination of a private key by observing properties of electricity in the power lines supplying hardware implementing the cryptosystem.

In a Simple Power Analysis (SPA) attack, an attacker monitors the power consumption of a device to visually identify large features of the scalar multiplication operation, kP. Indeed, monitoring of the power consumption during a scalar multiplication operation may enable an attacker to recognize exact instructions as the instructions are executed. For example, consider that the difference between the power consumption for the execution of a point doubling (D) operation and power consumption for the execution of a point addition (A) operation is obvious. Then, by investigating one power trace of a complete execution of a double-and-add algorithm employed to perform a scalar multiplication, the bits of the scalar private key k may be revealed. In particular, whenever a D operation is followed by an A operation, the corresponding bit $k_i=1$, otherwise if a D operation is followed by another D operation, then $k_i=0$. A sequence of doubling and addition point operations is referred to as a DA sequence.

In a Differential Power Analysis (DPA) side-channel attack, an attacker exploits the varying power consumed by a microprocessor while the microprocessor executes cryptographic program code. Using statistical analysis of the power consumption measurements of many runs of a given cryptographic algorithm, the attacker may infer information about a secret key used in the given cryptographic algorithm. A DPA attack on a scalar multiplication algorithm may be based on collecting hundreds of power consumption measurements obtained during the execution of the scalar multiplication with the same private key. Even if the execution is SPA-resistant, a statistical analysis on the measurements collected can still reveal the private key.

The Digital Signature Algorithm (DSA) is a United States Federal Government standard or Federal Information Processing Standard (FIPS) for digital signatures. The DSA was proposed by the National Institute of Standards and Technology in August 1991 for use in their Digital Signature Standard (DSS), specified in FIPS 186 (available as www.itl.nist.gov/fipspubs/fip186.htm), and was adopted in 1993. A minor revision was issued in 1996 as FIPS 186-1 (available as www-.mozilla.org/projects/security/pki/nss/fips1861.pdf), and the standard was expanded further in 2000 as FIPS 186-2 (available as csrc.nist.gov/publications/fips/fips186-2/fips186-2-change1.pdf).

Elliptic Curve DSA (ECDSA) is a variant of the DSA that operates on elliptic curve groups. The EC variant of the DSA may be selected to provide smaller key sizes for a similar security level.

Operation of the ECDSA commences in response to, for instance, a first party, say, "Alice", wanting to send a signed message to a second party, say, "Bob". Given a base point, P, of prime order g, Alice's private key, $d_A$, and a message, M, the ECDSA may be used to determine a signature (r, s), where the elements of the signature, r and s, are integers in [1, g−1]. For Alice's processor to sign a message M, Alice's processor executes the following example steps illustrated in FIG. 1. Initially, Alice's processor receives (step 102) the message M. Responsive to receiving the message, Alice's processor determines m=HASH(M) (step 104), where HASH is a cryptographic hash function, such as one of the Secure Hash Algorithms, for instance, SHA-1 (see RFC 3174 at tools.ietf.org). Alice's processor then selects (step 106) a random integer k from [1, g−1]. Alice's processor uses the random integer to determine r=$x_1$ mod g (step 108), where ($x_1$, $y_1$)=kP. Alice's processor then determines whether r=0 (step 110). If r=0, Alice's processor selects (step 106) another random integer k from [1, g−1]. If r≠0, Alice's processor obtains (step 112)

$$s=k^{-1}(m+d_A r) \bmod g. \quad (1.4)$$

Alice's processor then determines whether s=0 (step 114). If s=0, Alice's processor selects (step 106) another random integer k from [1, g−1]. If s≠0, Alice's processor publishes the signature (r, s) (step 116) locally. Furthermore, after completion of the method illustrated in FIG. 1, Alice's processor may transmit the message M and the signature (r, s) to a destination, i.e., to Bob.

The order of operations in the obtaining of s in step 112 begins with a first modular multiplication operation, $\xi=d_A r$ mod g, followed by a modular addition operation, $\beta=(m+\xi)$ mod g, and, finally, a second modular multiplication operation, $s=k^{-1}\beta$ mod g for a total of one modular inversion operation, two modular multiplication operations and one modular addition operation.

For Bob's processor to authenticate Alice's signature, Bob's processor must have a copy of Alice's public key $Q_A$, which Alice's processor is assumed to have previously determined from $Q_A=d_A P$ and published in a manner that made $Q_A$ available to Bob's processor. Bob's processor then follows the example steps in the method of FIG. 2.

Responsive to receiving (step 202) the message M and the signature (r, s). Bob's processor initially verifies (step 204) that the elements of the signature, r and s, are integers in [1, g−1]. If r and s are not integers in the specified range, Bob's processor may indicate (step 218) that the signature is invalid. Once it has been verified that r and s are integers, Bob's processor obtains a hash of the message (step 206), that is, determines m=HASH(M), where HASH is the same function used in the signature generation. Subsequently, Bob's processor determines w=$(s-1)$mod g (step 208) for use in subsequent steps. In particular, Bob's processor uses w to determine $u_1$=mw mod g and $u_2$=rw mod g (step 210). The values of $u_1$ and $u_2$ are then used by Bob's processor to determine ($x_1$, $y_1$)=$u_1 P+u_2 Q_A$ (step 212). Bob's processor then determines whether $x_1$=r mod g (step 214). Where $x_1$=r mod g, Bob's processor may indicate (step 216) that the signature is valid, i.e., that Alice is the author of the message M. If $x_1$≠r mod g, Bob's processor may indicate (step 218) that the signature is invalid, i.e., that there is no guarantee that Alice is the author of the message M.

In Messerges, T., Power Analysis Attacks and Countermeasures for Cryptographic Algorithms, PhD thesis, University of Illinois, Chicago, 2000 (hereinafter "Messerges"), it is suggested that an attacker, given knowledge of r, may determine the private key, $d_A$, using a DPA attack on the determination of s in step 112. That is, an attacker, given knowledge of r, may determine the private key, $d_A$, using a DPA attack on the modular multiplication of $d_A$ and r in equation (1.4).

Conveniently, Messerges also proposes a countermeasure to DPA attacks. The countermeasure involves multiplying both m and $d_A$ by a random integer ω and, after determining $$s'=k^{-1}(m\omega+rd_A\omega)\bmod g, \quad (1.5)$$

multiplying s' by $\omega^{-1}$. Note that the processor performs a first modular multiplication operation, $\xi=d_A\omega$ mod g, a second modular multiplication operation, $\alpha=r\xi$ mod g, a third modular multiplication operation, $\chi=m\omega$ mod g, a modular addition operation, $\beta=(\chi+\alpha)$ mod g, a fourth modular multiplication operation, $s'=k^{-1}\beta$ mod g, and a fifth modular multiplication operation, $s=s'\omega^{-1}$ mod g for a total of five modular multiplication operations, two modular inversions and one modular addition operation. Compared to the original ECDSA, the countermeasure proposed by Messerges involves an additional three modular multiplication operations and one additional modular inversion. Notably, due to the modulus operation, it is unnecessary for the processor to determine an intermediate value combining r with $d_A$. Accordingly, a first-order DPA attack as described by Messerges is not applicable. Additionally, a second-order DPA attack is not applicable. For information on second-order DPA attacks, see, for instance, M. Joye, P. Paillier & B. Schoenmakers "On second-order differential power analysis", Cryptographic Hardware and Embedded Systems—CHES '05, LNCS, vol. 3659, pp. 293-308. Springer-Verlag, 2005.

It would be desirable to execute the ECDSA to obtain a digital signature for association with messages, where such execution resists revealing the long term key to an attacker that is using a DPA attack. While Messerges has provided one countermeasure, other countermeasures, that introduce fewer additional modular operations, may be available.

In overview, providing variation in the order of arithmetic operations in which the long term key is involved, thereby masking the use of the long term key, obviates the vulnerability in the determination of the signature during execution of the ECDSA. That is, by modifying the sequence of operations involved in the determination of the signature and the inputs to those operations, DPA attacks, such as those described by Messerges, are not applicable.

In one aspect, the modular multiplication of $d_A$ and r in equation (1.4) may be subjected to multiplicative splitting using the random integer ω. That is, $$s=k^{-1}[m+(d_A\omega)(\omega^{-1}r)] \bmod g. \quad (1.6)$$

Where the random integer ω may be considered to be a "masking factor" since it allows for avoidance of exposure of the $d_A r$ modular multiplication to power analysis attacks.

Figure 3:
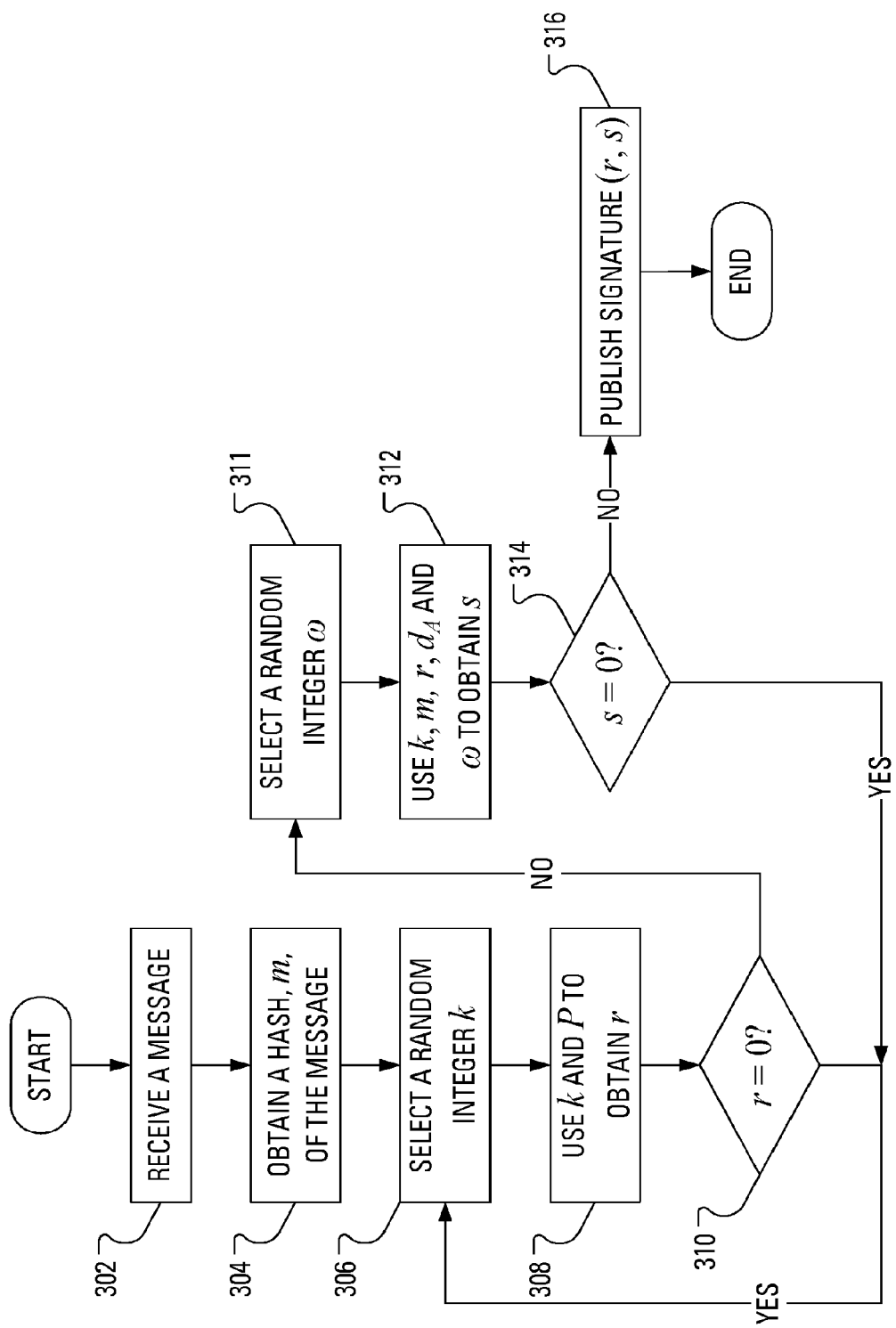
FIG. 3 illustrates steps of a second method of carrying out the ECDSA while implementing measures countering power analysis attacks according to an embodiment.

Operation of the ECDSA with the DPA countermeasure as suggested by equation (1.6) is illustrated in FIG. 3. Initially, Alice's processor receives (step 302) the message M. Responsive to receiving the message, Alice's processor determines m=HASH(M) (step 304), where HASH is a cryptographic hash function, such as one of the Secure Hash Algorithms, for instance, SHA-1. Alice's processor then selects (step 306) a random integer k from [1, g−1]. Alice's processor uses the random integer to determine $r=x_1 \mod g$ (step 308), where $(x_1, y_1)=kP$. Alice's processor then determines whether $r=0$ (step 310). If $r=0$, Alice's processor selects (step 306) another random integer k from [1, g−1]. If $r\ne 0$, Alice's processor selects (step 311) a further random integer ω from [1, g−1] and then obtains s (step 312) according to equation (1.6). Alice's processor then determines whether s=0 (step 114). If s=0, Alice's processor selects (step 306) another random integer k from [1, g−1]. If s≠0, Alice's processor publishes the signature (r, s) (step 316) locally. Furthermore, after completion of the method illustrated in FIG. 3, Alice's processor may transmit the message M and the signature (r, s) to a destination.

In one example embodiment, the order of operations in the obtaining of s in step 312 begins with a modular inversion operation, followed by a first modular multiplication operation, $\xi=\omega^{-1}r \mod g$, followed by a second modular multiplication operation, $\xi_2=d_A\omega \mod g$, a third modular multiplication operation, $\alpha=\xi_1\xi_2 \mod g$, a modular addition operation, $\beta=(m+\alpha) \mod g$, and, finally, a fourth modular multiplication operation, $s=k^{-1}\beta \mod g$ for a total of two modular inversion operations, four modular multiplication operations and one modular addition operation. Compared to the original ECDSA, the countermeasure represented by equation (1.6) involves one additional modular inversion and two additional modular multiplication operations. Note that, due to the multiplicative splitting, it is unnecessary for the processor to determine an intermediate value combining r with $d_A$. Thus, neither first-order DPA attacks nor second-order DPA attacks are applicable to obtaining s (step 312) according to equation (1.6).

In another aspect, the order of operations in equation (1.4) may be rearranged. That is, $$s=[k^{-1}m+(k^{-1}d_A)r] \mod g. \quad (1.7)$$

Where the term $k^{-1}$ may be considered to be a "masking factor" since it allows for avoidance of exposure of the $d_A r$ modular multiplication to power analysis attacks.

Operation of the ECDSA with the DPA countermeasure as suggested by equation (1.7) follows the operation illustrated in FIG. 1, with the difference between the present method and the previous method, suggested by equation (1.6), being defined by the execution of step 112. Initially, Alice's processor receives (step 102) the message M. Responsive to receiving the message, Alice's processor determines m=HASH(M) (step 104), where HASH is a cryptographic hash function, such as one of the Secure Hash Algorithms, for instance, SHA-1. Alice's processor then selects (step 106) a random integer k from [1, g−1]. Alice's processor uses the random integer to determine $r=x_1 \mod g$ (step 108), where $(x_1, y_1)=kP$. Alice's processor then determines whether r=0 (step 110). If r=0, Alice's processor selects (step 106) another random integer k from [1, g−1]. If r≠0, Alice's processor obtains s (step 112) according to equation (1.7). Alice's processor then determines whether s=0 (step 114). If s=0, Alice's processor selects (step 106) another random integer k from [1, g−1]. If s≠0, Alice's processor transmits the message M and publishes the signature (r, s) (step 116) to a destination.

The order of operations in the obtaining of s in step 112 according to equation (1.7) begins with a first modular multiplication operation, $\xi=k^{-1}d_A \mod g$, followed by a second modular multiplication operation, $\alpha=\xi r \mod g$, a third modular multiplication operation, $\beta=k^{-1}m \mod g$, and, finally, a modular addition operation, $s=(\beta+\alpha) \mod g$ for a total of three modular multiplication operations and one modular addition operation. Compared to the original ECDSA, the countermeasure represented by equation (1.7) involves only one additional modular multiplication operation. Note that, due to the alteration of the order of operations, it is unnecessary for the processor to determine an intermediate value combining r with $d_A$. Thus, neither first-order DPA attacks nor second-order DPA attacks are applicable to obtaining s (step 112) according to equation (1.7).

Figure 2:
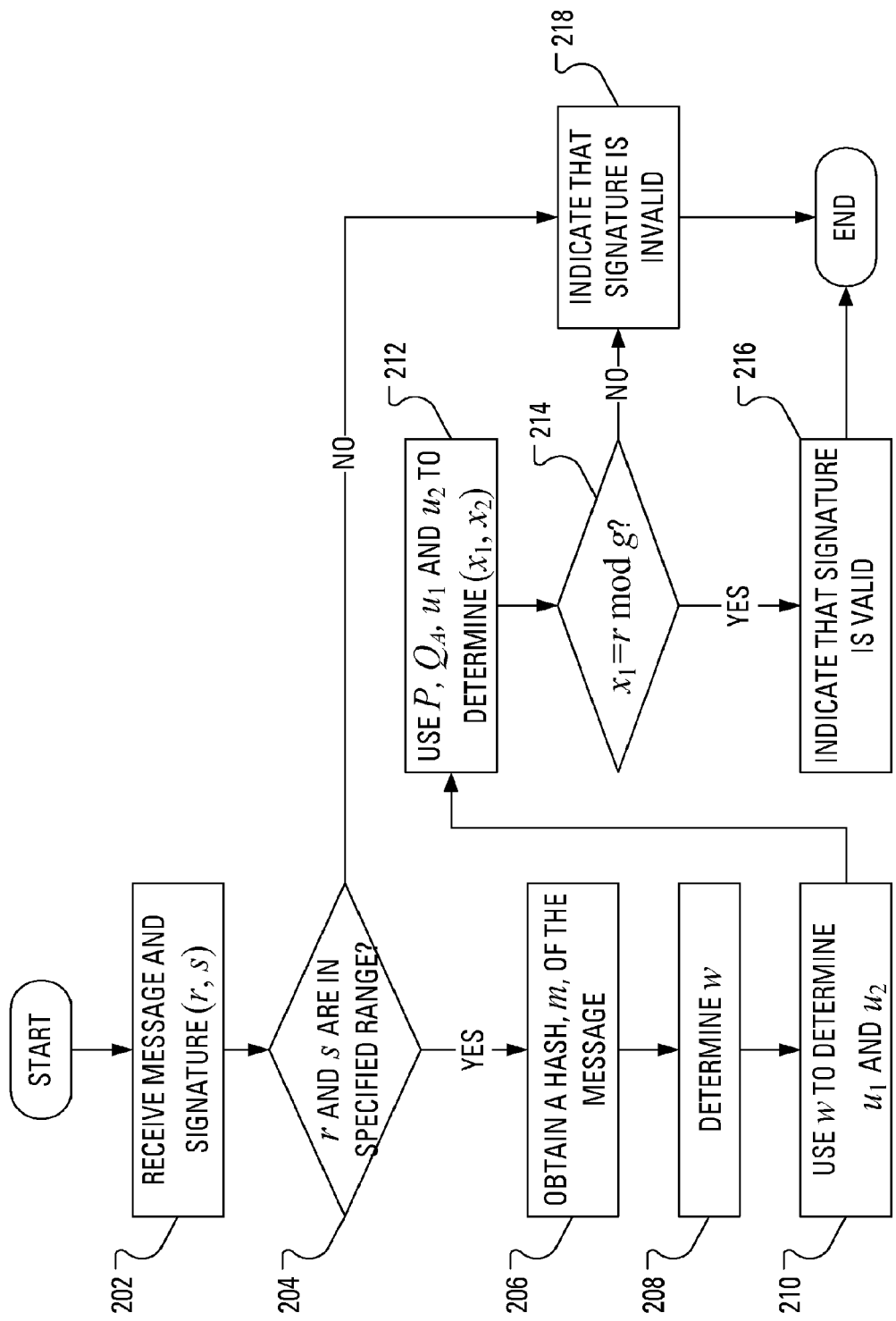
FIG. 2 illustrates steps of a first method of carrying out the ECDSA while implementing measures countering power analysis attacks according to an embodiment.
Figure 4:
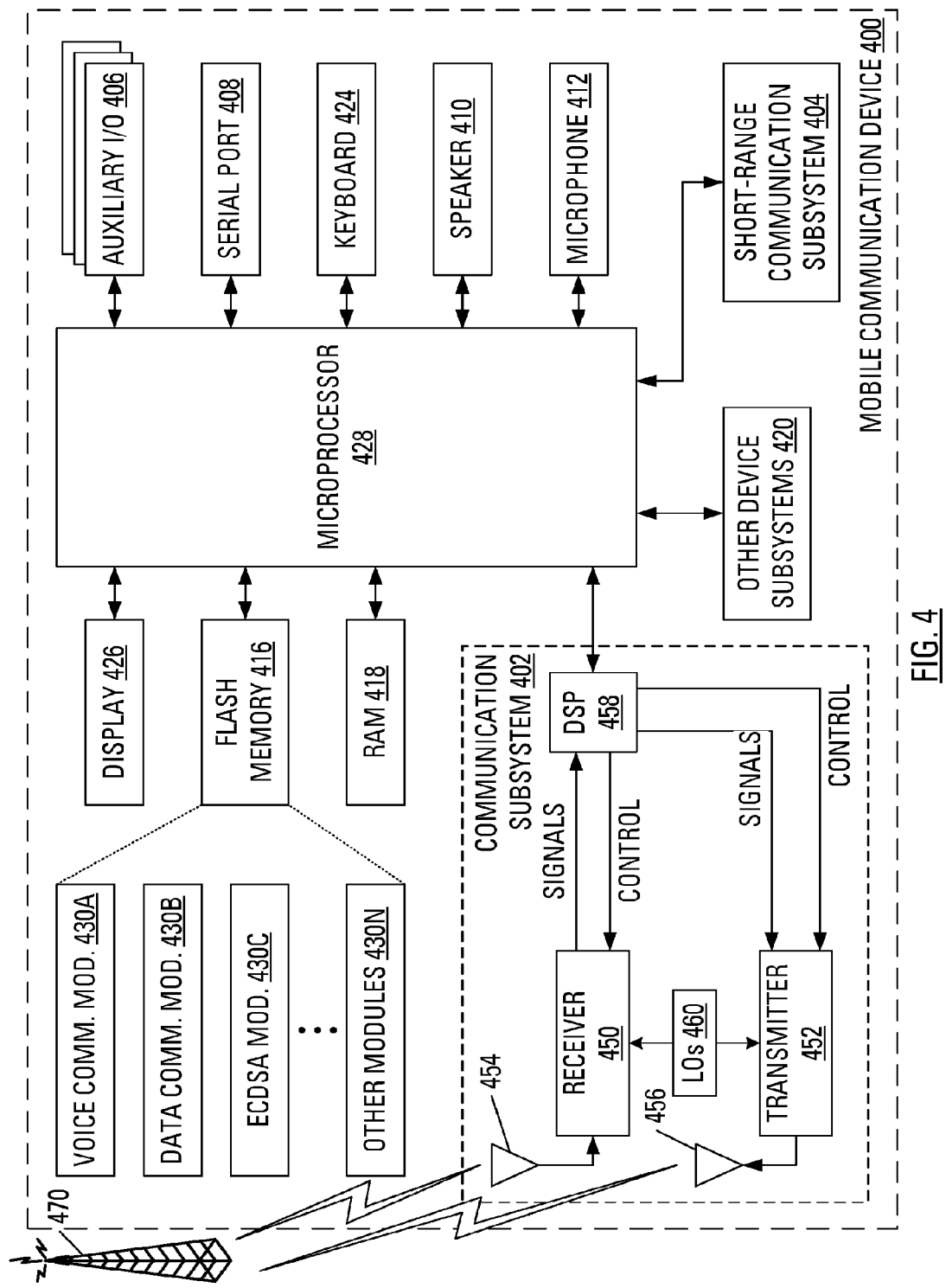
FIG. 4 illustrates an apparatus for carrying out the method of FIG. 2 or FIG. 3.

FIG. 4 illustrates a mobile communication device 400 as an example of a device that may carry out the methods of FIG. 2 and/or FIG. 3. The mobile communication device 400 includes a housing, an input device (e.g., a keyboard 424 having a plurality of keys) and an output device (e.g., a display 426), which may be a full graphic, or full color, Liquid Crystal Display (LCD). In some embodiments, the display 426 may comprise a touchscreen display. In such embodiments, the keyboard 424 may comprise a virtual keyboard. Other types of output devices may alternatively be utilized. A processing device (a microprocessor 428) is shown schematically in FIG. 4 as coupled between the keyboard 424 and the display 426. The microprocessor 428 controls the operation of the display 426, as well as the overall operation of the mobile communication device 400, in part, responsive to actuation of the keys on the keyboard 424 by a user.

The housing may be elongated vertically, or may take on other sizes and shapes (including clamshell housing structures). Where the keyboard 424 includes keys that are associated with at least one alphabetic character and at least one numeric character, the keyboard 424 may include a mode selection key, or other hardware or software, for switching between alphabetic entry and numeric entry.

In addition to the microprocessor 428, other parts of the mobile communication device 400 are shown schematically in FIG. 4. These may include a communications subsystem 402, a short-range communications subsystem 404, the keyboard 424 and the display 426. The mobile communication device 400 may further include other input/output devices including a set of auxiliary I/O devices 406, a serial port 408, a speaker 410 and a microphone 412. The mobile communication device 400 may further include memory devices including a flash memory 416 and a Random Access Memory (RAM) 418 and various other device subsystems 420. The mobile communication device 400 may be a two-way radio frequency (RF) communication device having voice and data communication capabilities. In addition, the mobile communication device 400 may have the capability to communicate with other computer systems via the Internet.

Operating system software executed by the microprocessor 428 may be stored in a computer readable medium, such as the flash memory 416, but may be stored in other types of memory devices, such as a read only memory (ROM) or similar storage element. In addition, system software, specific device applications, or parts thereof, may be temporarily loaded into a volatile store, such as the RAM 418. Communication signals received by the mobile device may also be stored to the RAM 418.

The microprocessor 428, in addition to its operating system functions, enables execution of software applications on the mobile communication device 400. A predetermined set of software applications that control basic device operations, such as a voice communications module 430A and a data communications module 430B, may be installed on the mobile communication device 400 during manufacture. A ECDSA module 430C may also be installed on the mobile communication device 400 during manufacture, to implement aspects of the present disclosure. As well, additional software modules, illustrated as an other software module 430N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network 470 represented by a radio tower. The data items managed by the PIM application may be seamlessly integrated, synchronized and updated via the wireless carrier network 470 with the device user's corresponding data items stored or associated with a host computer system.

Communication functions, including data and voice communications, are performed through the communication subsystem 402 and, possibly, through the short-range communications subsystem 404. The communication subsystem 402 includes a receiver 450, a transmitter 452 and one or more antennas, illustrated as a receive antenna 454 and a transmit antenna 456. In addition, the communication subsystem 402 also includes a processing module, such as a digital signal processor (DSP) 458, and local oscillators (LOs) 460. The specific design and implementation of the communication subsystem 402 is dependent upon the communication network in which the mobile communication device 400 is intended to operate. For example, the communication subsystem 402 of the mobile communication device 400 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the mobile communication device 400.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 400 may send and receive communication signals over the wireless carrier network 470. Signals received from the wireless carrier network 470 by the receive antenna 454 are routed to the receiver 450, which provides for signal amplification, frequency down conversion, filtering, channel selection, etc., and may also provide analog to digital conversion. Analog-to-digital conversion of the received signal allows the DSP 458 to perform more complex communication functions, such as demodulation and decoding. In a similar manner, signals to be transmitted to the wireless carrier network 470 are processed (e.g., modulated and encoded) by the DSP 458 and are then provided to the transmitter 452 for digital to analog conversion, frequency up conversion, filtering, amplification and transmission to the wireless carrier network 470 (or networks) via the transmit antenna 456.

In addition to processing communication signals, the DSP 458 provides for control of the receiver 450 and the transmitter 452. For example, gains applied to communication signals in the receiver 450 and the transmitter 452 may be adaptively controlled through automatic gain control algorithms implemented in the DSP 458.

In a data communication mode, a received signal, such as a text message or web page download, is processed by the communication subsystem 402 and is input to the microprocessor 428. The received signal is then further processed by the microprocessor 428 for output to the display 426, or alternatively to some auxiliary I/O devices 406. A device user may also compose data items, such as e-mail messages, using the keyboard 424 and/or some other auxiliary I/O device 406, such as a touchpad, a rocker switch, a thumb-wheel, a trackball, a touchscreen, or some other type of input device. The composed data items may then be transmitted over the wireless carrier network 470 via the communication subsystem 402.

In a voice communication mode, overall operation of the device is substantially similar to the data communication mode, except that received signals are output to a speaker 410, and signals for transmission are generated by a microphone 412. Alternative voice or audio I/O subsystems, such as a voice message recording subsystem, may also be implemented on the mobile communication device 400. In addition, the display 426 may also be utilized in voice communication mode, for example, to display the identity of a calling party, the duration of a voice call, or other voice call related information.

The short-range communications subsystem 404 enables communication between the mobile communication device 400 and other proximate systems or devices, which need not necessarily be similar devices. For example, the short-range communications subsystem may include an infrared device and associated circuits and components, or a Bluetooth™ communication module to provide for communication with similarly-enabled systems and devices.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of publishing a signature related to a message in a manner that counters power analysis attacks, wherein a private cryptographic key and a base point on a given elliptic curve have been selected, said base point having a prime order, said method comprising:

receiving, by a processing device, said message;
obtaining, by the processing device, a hash of said message;
selecting, by the processing device, a random integer;
obtaining, by the processing device, a non-zero first element of said signature based on said base point and said random integer;
obtaining, by the processing device, a non-zero second element of said signature based on said random integer, said hash, said first element, said private cryptographic key and a modular inverse of said random integer, wherein said obtaining said second element involves:
determining a first modular multiplication product of said private cryptographic key and said modular inverse of said random integer; and
determining a second modular multiplication product of said first modular multiplication product and a modular multiple of said first element; and
publishing, by the processing device, said first element of said signature and said second element of said signature.

2. The method of claim 1, wherein said modular multiple of said first element is said first element.

3. The method of claim 2 wherein said obtaining said second element evaluating:

$$s=[k^{-1}m+(k^{-1}d_A)r] \bmod g$$

wherein
s is said second element;
k is said random integer;
m is said hash;
$d_A$ is said private cryptographic key;
r is said first element; and
g is said prime order of said base point.

4. A mobile communication device for publishing a signature related to a message in a manner that counters power analysis attacks, wherein a private cryptographic key and a base point on a given elliptic curve have been selected, said base point having a prime order, said apparatus comprising:
a processor configured to:
receive said message;
obtain a hash of said message;
select a random integer;
obtain a non-zero first element of said signature based on said base point and said random integer;
obtain a non-zero second element of said signature based on said random integer, said hash, said first element, said private cryptographic key and a modular inverse of said random integer, by:
determining a first modular multiplication product of said private cryptographic key and said modular inverse of said random integer; and
determining a second modular multiplication product of said first modular multiplication product and a modular multiple of said first element; and
publish said first element of said signature and said second element of said signature.

5. A non-transitory computer readable medium containing computer-executable instructions that, when executed on a processor given a private cryptographic key and a base point on a given elliptic curve, said base point having a prime order, cause said processor to:
receive a message;
obtain a hash of said message;
select a random integer;
obtain a non-zero first element of a signature based on said base point and said random integer;
obtain a non-zero second element of said signature based on said random integer, said hash, said first element, said private cryptographic key and a modular inverse of said random integer, by:
determining a first modular multiplication product of said private cryptographic key and said modular inverse of said random integer; and
determining a second modular multiplication product of said first modular multiplication product and a modular multiple of said first element; and
publish said first element of said signature and said second element of said signature.

* * * * *